United States Patent
Kirshner

[11] Patent Number: 6,139,306
[45] Date of Patent: Oct. 31, 2000

[54] APPARATUS FOR EXPANDING POLYMERIC TUBING

[76] Inventor: Brian M. Kirshner, 113 Beach Park Blvd., Foster City, Calif. 94404

[21] Appl. No.: 09/180,965
[22] PCT Filed: May 29, 1997
[86] PCT No.: PCT/US97/09377
§ 371 Date: Nov. 12, 1998
§ 102(e) Date: Nov. 12, 1998
[87] PCT Pub. No.: WO97/45247
PCT Pub. Date: Dec. 4, 1997
[51] Int. Cl.[7] ................................................. B29C 55/28
[52] U.S. Cl. .................. 425/140; 425/387.1; 425/388; 425/392; 425/DIG. 1
[58] Field of Search ........................ 425/140, 141, 425/387.1, 388, 392, DIG. 1; 264/564, 566, 568, 571

[56] References Cited

U.S. PATENT DOCUMENTS

| | | | |
|---|---|---|---|
| 2,936,491 | 5/1960 | Hamlin | 264/568 |
| 3,086,242 | 4/1963 | Cook et al. | 18/1 |
| 3,370,112 | 2/1968 | Wray | 264/22 |
| 3,687,585 | 8/1972 | Takagi et al. | 425/71 |
| 3,960,997 | 6/1976 | Sorensen | 264/40 |
| 4,978,223 | 12/1990 | Kutchenriter et al. | 356/384 |
| 5,810,236 | 9/1998 | Yoshida et al. | 226/118.3 |

OTHER PUBLICATIONS

Search Report for International Application No. PCT/US97/09377.

*Primary Examiner*—Harold Pyon
*Assistant Examiner*—Donald Heckenberg

[57] ABSTRACT

An apparatus and process for expanding polymeric tubing including a bubble of trapped gas within the polymeric tubing. The tubing is expanded by creating a pressure differential between the inside and outside of the tubing such that the pressure inside the tubing is greater than the pressure outside the tubing, thereby causing the tubing to expand. It is possible with the present invention to compensate for loss of gas pressure, thereby increasing the amount of tubing which can be expanded without ceasing production and restarting the process.

9 Claims, 2 Drawing Sheets

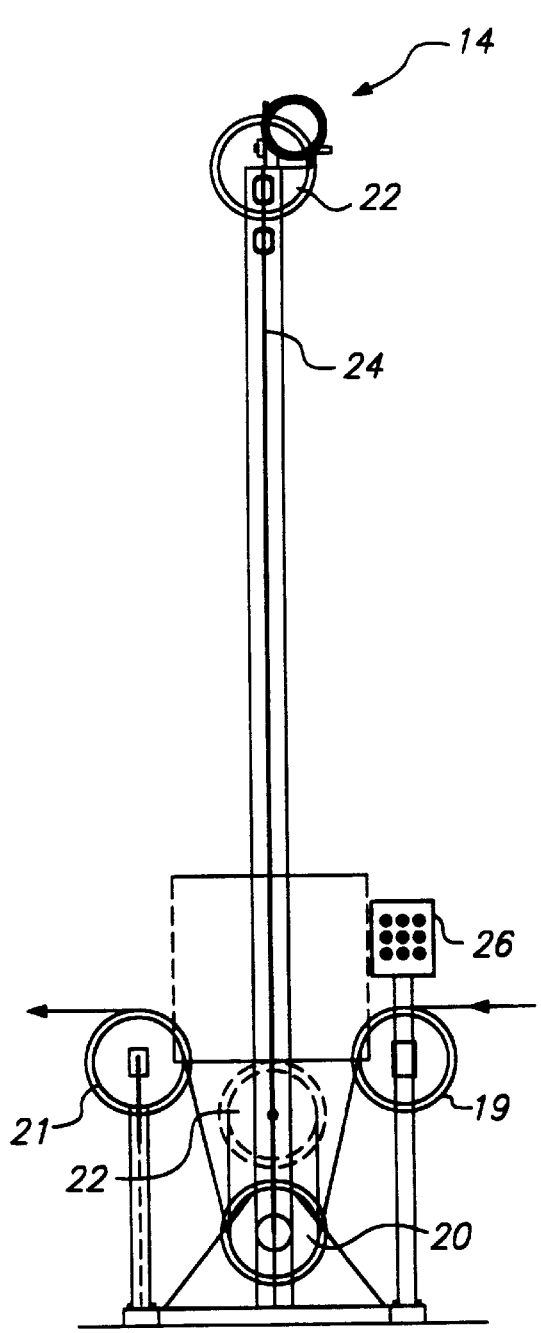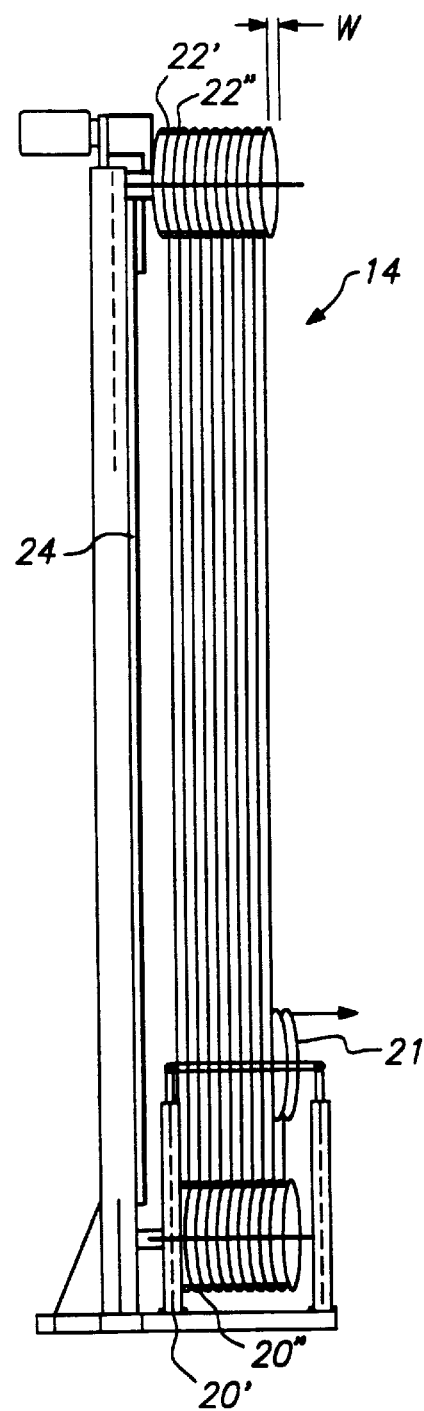
FIG. 2   FIG. 3

APPARATUS FOR EXPANDING POLYMERIC TUBING

This invention relates to an apparatus and method of expanding polymeric tubing, particularly for expanding heat recoverable polymeric tubing.

BACKGROUND OF THE INVENTION

U.S. Pat. No. 3,370,112 to Wray and U.S. Pat. No. 3,086,242 to Cook et al disclose processes and apparatus for expanding tubing by employing a pressure differential between the inside and outside of the tubing. Both of these patents are incorporated by reference herein for all purposes. Cook et al and Wray describe processes for producing heat recoverable tubing by cross-linking and expanding a tube of polymeric material. In both cases, the tubing is expanded by employing a pressure differential between the inside and outside of the tubing. The first step in the process is to cross-link the tubing. After the tubing is cross-linked, it is heated to a temperature equal to or above its crystalline melting temperature or range so as to melt the crystals in the material. While the tubing is at the elevated temperature, a pressure differential is imparted across the tubing wall to expand the tubing. While subjected to this differential pressure, the tubing is passed through a cooling zone to cool the tubing to a temperature below the crystalline melting temperature or range. The pressure differential is imparted by continuously supplying air to the interior of the tubing, while applying ambient or sub-ambient pressure outside the tubing. Upon re-heating, the tubing will recover to the configuration it had when cross-linked.

An alternative method of imparting a pressure differential is to trap a bubble of air within the polymeric tubing while again applying ambient or sub-ambient pressure outside the tubing. Over time, the pressure in the tubing bubble will drop as a result of permeation of gas into the tubing wall and also by way of air escaping through the ends of the bubble of air. As the pressure drops, the outer diameter of the tubing becomes smaller, resulting in production of tubing that may not meet the required specifications.

An attempt to increase the amount of tubing processed which meet desired specifications by using a bubble of air is described in U.S. Pat. No. 3,687,585 to Takagi et al. Takagi et al discloses confined movement between the ends of a bubble of air. However, the increase in the amount of tubing processed is limited by the space available in which the ends of the bubble of air can be linearly separated from each other. Once the space has been consumed, additional air must be supplied to the inside of the tubing by ceasing production and restarting the process.

SUMMARY OF THE INVENTION

I have invented an apparatus and method for continuously expanding tubing by substantially increasing the ability to compensate for loss of gas pressure, even with limited space.

A first aspect of the invention comprises an apparatus for expanding polymeric tubing comprising:

- a first set of nip rolls through which expandable polymeric tubing can be passed, the polymeric tubing having a wall;
- a second set of nip rolls downstream from the first set of nip rolls through which expanded tubing can be passed;
- a heating zone for heating the expandable polymeric tubing;
- means for creating a pressure differential between the inside and outside of the tubing so that, in use, a bubble of pressurized gas is trapped within the tubing between the first and second sets of nip rolls, and such that the pressure differential across the tubing wall causes the tubing to expand;
- a cooling chamber for cooling the tubing;
- means for sensing changes in the outer diameter of the expanded tubing as it emerges from the cooling chamber;
- an accumulator which is positioned downstream from the first set of nip rolls and which comprises a plurality of lower pulley wheels and a plurality of upper pulley wheels, the lower and upper pulley wheels being such that the expanded tubing follows a sinuous path which passes successively between lower and upper pulley wheels;
- means for adjusting the relative position of the lower and upper pulley wheels based upon the sensing of the outer diameter of the expanded tubing, the length of said sinuous path being adjustable between a minimum length and a maximum length, the difference between the minimum and maximum lengths being at least 25 feet.

A second aspect of the present invention comprises a method of expanding polymeric tubing comprising:

- providing expandable polymeric tubing;
- passing the polymeric expandable tubing through a first set of nip rolls and a second set of nip rolls;
- passing the expandable tubing through a heating zone;
- forming a bubble of pressurized gas within the tubing between the first and second nip rolls, thereby causing the heated expandable tubing to expand;
- passing the tubing through a cooling chamber to fix the tubing in an expanded configuration;
- sensing changes in the outer diameter of the cooled expanded tubing;
- passing the cooled expanded tubing through an accumulator which is downstream from the cooling chamber and between the first and second nip rolls, and which comprises a plurality of lower pulley wheels and a plurality of upper pulley wheels, the lower and upper pulley wheels being such that the expanded tubing follows a sinuous path which passes successively between lower and upper pulley wheels, and the relative positions of the lower and upper pulley wheels being adjustable so that the length of said sinuous path is adjustable between a minimum length and a maximum length, the difference between the minimum and maximum lengths being at least 25 feet; and
- adjusting the relative position of the lower and upper pulley wheels in response to changes sensed in the outer diameter of the expanded tubing so as to thereby maintain a substantially uniform outer diameter of the expanded tubing.

A third aspect of the present invention comprises a method of expanding polymeric tubing comprising:

- providing expandable polymeric tubing;
- passing the polymeric expandable tubing through a first set of nip rolls and a second set of nip rolls;
- passing the expandable tubing through a heating zone;
- forming a bubble of pressurized gas within the tubing between the first and second nip rolls, thereby causing the heated expandable tubing to expand;
- passing the tubing through a cooling chamber to fix the tubing in an expanded configuration;

sensing changes in the outer diameter of the cooled, expanded tubing;

passing the cooled expanded tubing through a first accumulator positioned downstream from the cooling chamber and between the first and second nip rolls, and which comprises a plurality of lower pulley sheels and a plurality of upper pulley sheels, the first accumulator being such that the expanded tubing follows a path which is adjustable between a minimum length and a maximum length;

adjusting the relative position of the lower and upper pulley wheels in response to changes sensed in the outer diameter of the expanded tubing so as to thereby maintain a substantially uniform outer diameter of the expanded tubing;

passing the tubing through a third set of nip rolls which is disposed upstream of the first and second nip rolls such that additional gas is trapped between the third set of nip rolls and the first set of nip rolls;

passing the tubing through a second accumulator positioned between the third set of nip rolls and the first set of nip rolls, the second accumulator being such that the tubing follows a path which is adjustable between a minimum length and a maximum length;

opening the first set of nip rolls;

adjusting the first and second accumulators such that as the accumulated tubing on the second accumulator is shortened, the accumulated tubing on the first accumulator is lengthened;

closing the first set of nip rolls after additional gas is added to the bubble of trapped gas; and opening the third set of nip rolls.

An additional aspect of the present invention comprises an apparatus for expanding polymeric tubing comprising:

a first set of nip rolls through which expandable polymeric tubing can be passed;

a second set of nip rolls downstream from the first set of nip rolls through which expanded tubing can be passed;

a heating zone for heating the expandable polymeric tubing;

means for creating a pressure differential between the inside and outside of the tubing so that, in use, a bubble of pressurized gas is trapped within the tubing between the first and second sets of nip rolls, and such that the pressure differential across the tubing wall causes the tubing to expand;

a cooling chamber for cooling the tubing;

means for sensing changes in the outer diameter of the expanded tubing as it emerges from the cooling chamber;

an accumulator which is positioned downstream from the first set of nip rolls and which comprises a plurality of lower pulley wheels and a plurality of upper pulley wheels;

means for adjusting the relative position of the lower and upper pulley wheels based upon the sensing of the outer diameter of the expanded tubing;

a third set of nip rolls which is disposed upstream of the first and second nip rolls such that additional gas is trapped between the third set of nip rolls and the first set of nip rolls;

a second accumulator disposed between the third set of nip rolls and the first set of nip rolls, the second accumulator comprising a plurality of lower pulley wheels and a plurality of upper pulley wheels; and wherein, in use, the bubble of gas trapped between the first and second sets of nip rolls is augmentable with additional gas trapped between the third set of nip rolls and the first set of nip rolls.

A further aspect of the present invention comprises a process for expanding polymeric tubing including a bubble of gas trapped within the polymeric tubing and expanding the tubing by creating a pressure differential such that pressure inside the tubing is greater than pressure outside the tubing, thereby causing the tubing to expand, the improvement comprising: use of an accumulator positioned downstream from expansion of the tubing, the accumulator comprising a plurality of lower pulley wheels and a plurality of upper pulley wheels, the lower and upper pulley wheels being such that the expanded tubing follows a sinuous path which passes successively between lower and upper pulley wheels.

BRIEF DESCRIPTION OF THE DRAWINGS

FIG. 2 is a partial side view of the present invention.

FIG. 3 is a front view of the present invention.

DETAILED DESCRIPTION OF THE PREFERRED EMBODIMENTS

Figure 1:
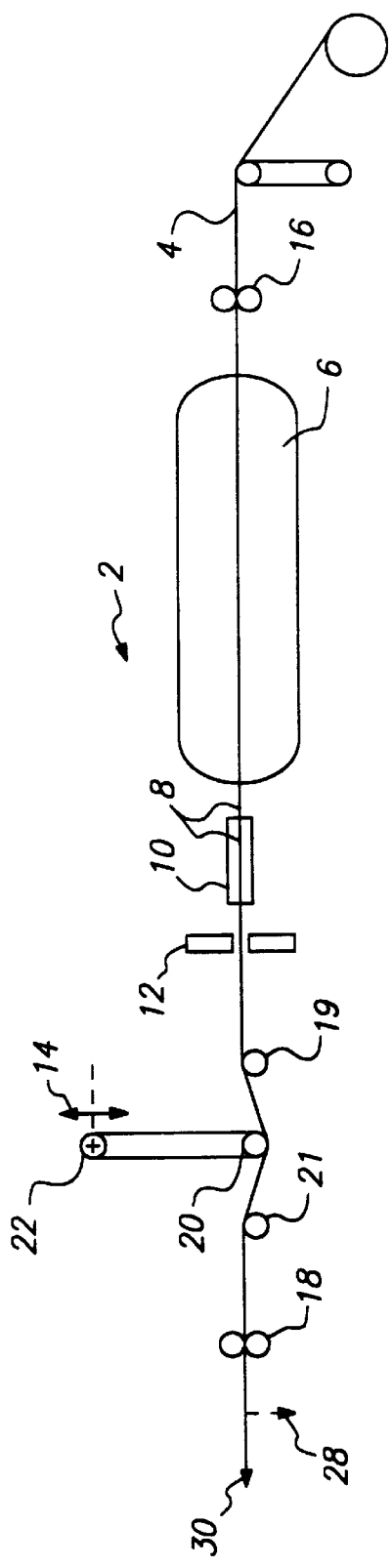
FIG. 1 is a schematic view of the present invention.

The present invention is directed to an apparatus and method of expanding polymeric tubing, particularly for expanding heat recoverable tubing. A bubble of gas is trapped inside the tubing to create a pressure differential such that pressure inside the tubing is greater than pressure outside the tubing, thereby causing the tubing to expand. The bubble of gas is trapped between first and second sets of nip rolls, the first set of nip rolls being positioned upstream from an expansion zone, the second set of nip rolls being positioned downstream from a cooling chamber. After the tubing is expanded, the outer diameter of the tubing is sensed as the tubing emerges from the cooling chamber to ascertain any changes in size.

The tubing may be warmed above its crystalline melting temperature in the heating zone by a variety of methods. These methods include direct contact, conductive type heating using fluids such as water, oil or glycerin. Convective or radiant type heating techniques may also be employed such as microwaves, infrared waves or a convective heating furnace. The preferred method is the use of direct contact heating using a warm glycerin bath.

The first set of nip rolls may be positioned upstream or downstream from the heating zone. The heating zone preferably comprises a pressure chamber, as described by Cook et al, U.S. Pat. No. 3,086,242, referred to above. While the expandable tubing is inside the pressure chamber, there is no change in the outer diameter of the tubing because the pressure inside and outside of the expandable tubing is equalized. The heating zone may also be at ambient pressure, as described by Wray, U.S. Pat. No. 3,370,112. After the tubing has passed through the heating zone, it is exposed to ambient or sub-ambient external pressure in the expansion zone. The pressure differential between the higher gas pressure within the tubing and the lower pressure external to the tubing causes the expandable tubing to expand.

The cooling chamber is preferably a hydraulically cooled die having a compartment which is designed to limit the size of the outer diameter of the tubing as it passes therethrough. However, any cooling means may be employed. For example, the chamber may be pneumatically cooled, rather than hydraulically cooled. The cooling die may also pull a vacuum on the tubing to assist in the expansion process by enhancing the pressure differential across the tubing wall. The vacuum could be applied either by housing the cooling chamber within a vacuum chamber or by applying the vacuum directly to the tubing.

The gas employed within the tubing to provide the pressure differential may be any desired gas, reactive or inert. Relatively inert gases such as air, nitrogen or carbon dioxide would be typical. Reactive gases such as nickel carbonyl, ethylene oxide, or chlorine may also be used to both expand and chemically modify the tubing. The gas selected may be chosen to optimize the expansion process, for example, to minimize permeation into the tubing wall.

An accumulator is positioned downstream from the expansion zone so that the pressure of the trapped bubble of gas can be adjusted to maintain a substantially uniform outer diameter of the expanded tubing. The accumulator comprises a plurality of lower pulley wheels and a plurality of upper pulley wheels. Pulley wheels are commonly referred to by those skilled in the art as "sheaves." The lower and upper pulley wheels are such that the expanded tubing follows a sinuous path which passes successively between the lower and upper pulley wheels. From the first lower pulley wheel, the tubing follows a sinuous path which passes successively to the first upper pulley wheel, then to the second lower pulley wheel, the second upper pulley wheel, and so on. The upper and lower pulley wheels are sized such that a variety of expanded tubing diameters may be wrapped around the pulley wheels. The tubing passes from the heating zone to the cooling chamber and on to the first lower pulley wheel of the accumulator.

In the preferred embodiment, the upper pulley wheels of the accumulator may be movable together as a set, relative to the lower pulley wheels. It should be noted, however, that any combination of upper and lower pulley wheels can be movable or the upper pulley wheels could be fixed with the lower pulley wheels being movable. It is noted that in the preferred embodiment, the first and second sets of nip rolls are stationary. Because only the pulley wheels are movable, this design provides a low inertia mechanism, and therefore quick responding, for modifying pressure within the tubing, unlike a system in which major elements are movable.

The size of the accumulator is chosen such that tubing can be continuously expanded for an entire production run, without the need to stop to add additional gas. The length of the sinuous path is adjustable between a minimum length and a maximum length, the difference between the minimum and maximum lengths being at least 25 feet, preferably between 25 and 500 feet, and more preferably between 50 and 200 feet. In the preferred embodiment, there are 8 lower pulley wheels and 8 upper pulley wheels. This number may be modified to accommodate the desired length of difference between the minimum and maximum, dependent upon the length of production run of expanding tubing desired, the tubing diameter, and the rate of permeation of the gas into the tubing wall.

In general, the length of sinuous path consumed is 1 foot of sinuous path for greater than 100 feet of tubing expanded, preferably 1 foot of sinuous path for between 100 and 2000 feet of tubing expanded, more preferably 1 foot of sinuous path for between 500 and 1000 feet of tubing expanded and most preferably 1 foot of sinuous path for approximately 750 feet of tubing expanded.

While it is preferable to position the accumulator downstream from the expansion zone, it can be positioned at any location between the first and second sets of nip rolls.

As the tubing emerges from the cooling chamber, the outer diameter of the tubing is sensed. The preferred sensing means is a laser micrometer, which measures the outer diameter of the tubing; however, any sensor which recognizes dimensions or changes in dimensions may be employed. If the outer diameter of the expanded tubing is smaller than desired, the relative position of the upper and lower pulley wheels is adjusted so that the length between the first and second sets of nip rolls is decreased, so as to increase the pressure of the bubble of gas and increase the tubing outer diameter to the desired outer diameter. Similarly, if the outer diameter of the expanded tubing is larger than desired, the accumulator is adjusted so that the length between the first and second sets of nip rolls is increased, so as to decrease the pressure of the bubble of gas and decrease the tubing outer diameter to the desired outer diameter. The adjustments to compensate for changes in the sensed size of the outer diameter of the tubing may be performed manually, or may be made by providing a feedback mechanism for automatically adjusting the relative positioning of the lower and upper pulley wheels.

The tubing is advanced along its path, through the first set of nip rolls, heating zone, cooling chamber, accumulator and second set of nip rolls. In the preferred embodiment, the path is generally horizontal, although the accumulator path between the lower and upper pulley wheels may be oriented vertically.

I have found that production runs of normal or longer than normal length can be produced using the apparatus described above without stopping and restarting the process. For particularly long production runs, in which the adjustment between the minimum and maximum length of sinuous path would otherwise be exhausted, the bubble of gas can be augmented in-line and without stopping the production run by use of a third set of nip rolls and a second accumulator. The second accumulator is similar to the accumulator described above. The third set of nip rolls is disposed along the tubing upstream of the trapped bubbled of gas. The second accumulator is disposed between the third set of nip rolls and the first set of nip rolls and adjusted such that the upper and lower pulley wheels are separated from each other. The third set of nip rolls must be upstream of the first nip rolls so that gas already within the tubing is used to augment the gas trapped between the first and second nip rolls. The tubing is pinched with the third set of nip rolls such that additional gas is trapped between the third set of nip rolls and the first set of nip rolls. The first set of nip rolls is then opened while simultaneously decreasing the length of sinuous path of the second accumulator. As additional gas is added to the trapped bubble of gas, the first accumulator is adjusted so that the sinuous path is lengthened. In this way, additional gas is added to the trapped bubble of gas between the first and second nip rolls. The first set of nip rolls is then closed, and the third set of nip rolls opened. The bubble of gas is thus regenerated, and production of expanded tubing can continue without interruption.

Referring now to the drawings, FIG. 1 shows a schematic view of the apparatus 2 of the present invention for expanding polymeric tubing 4. Apparatus 2 includes a heating zone 6 followed downstream by an expansion zone 8 and a cooling chamber 10 where a pressure differential is created such that the pressure inside the tubing is greater than the pressure outside the tubing. As tubing 4 exits cooling chamber 10, a sensor 12 senses changes in the outer diameter of tubing 4. An accumulator 14 is disposed downstream from cooling chamber 10 such that the length of path between the upper and lower pulley wheels can be adjusted, varying the length of tubing passing along a sinuous path. A first set of nip rolls 16 is disposed upstream from expansion zone 8 while a second set of nip rolls 18 is disposed downstream from accumulator 14.

Accumulator 14 includes an inlet pulley wheel 19, lower pulley wheels 20, upper pulley wheels 22, and outlet pulley wheel 21. As will be described below, tubing 4 is threaded from sensor 12 to accumulator 14. As best seen in FIGS. 2 and 3, the tubing is first wrapped across inlet pulley wheel 19, around a first lower pulley wheel 20' and then to a first upper pulley wheel 22', alternatively to a second lower pulley wheel 20", a second upper pulley wheel 22", and along as many lower and upper pulley wheels as are necessary to provide the required length of sinuous path. After the tubing is wrapped around the last lower pulley wheel employed, the tubing crosses outlet pulley wheel 21 and moves on to second set of nip rolls 18. Each pulley wheel has a width w sufficient to accommodate the largest outer diameter of expanded tubing to be processed by apparatus 2. Upper and lower pulley wheels 20, 22 are mounted on accumulator frame 24. The embodiment shown in FIGS. 2 and 3 show lower pulley wheels 20 fixed on frame 24 while upper pulley wheels 22 are adjustable relative to the lower pulley wheels with controls 26. Controls 26 operate a motor which moves the upper pulley wheels on frame 24. The controls shown in the Figures are operated manually; however, it is within the scope of the present invention that relative movement of the pulley wheels be controlled automatically by a feedback mechanism.

An off-line gas supply line 28 is employed upon start-up of production of expanding tubing 4 to initially expand the tubing. Once production of expanded tubing begins, the first and second sets of nip rolls are closed, trapping a bubble of air. Tubing 4 is severed from supply line 28 and directed to finishing equipment 30, as described below.

Unlike the prior art arrangements, it is possible to direct the tubing to finishing equipment because additional gas supply is not required to maintain tubing dimensions for at least tens of thousands of feet. Finishing equipment may be any type of take-up reel or apparatus for further processing of the expanded tubing. For example, the finishing equipment may include manual or automatic spooling or cutting equipment. The cutting equipment may produce short pieces, for example, less then 6 inches in length, or longer pieces, greater than 4 feet in length.

Figure 4:
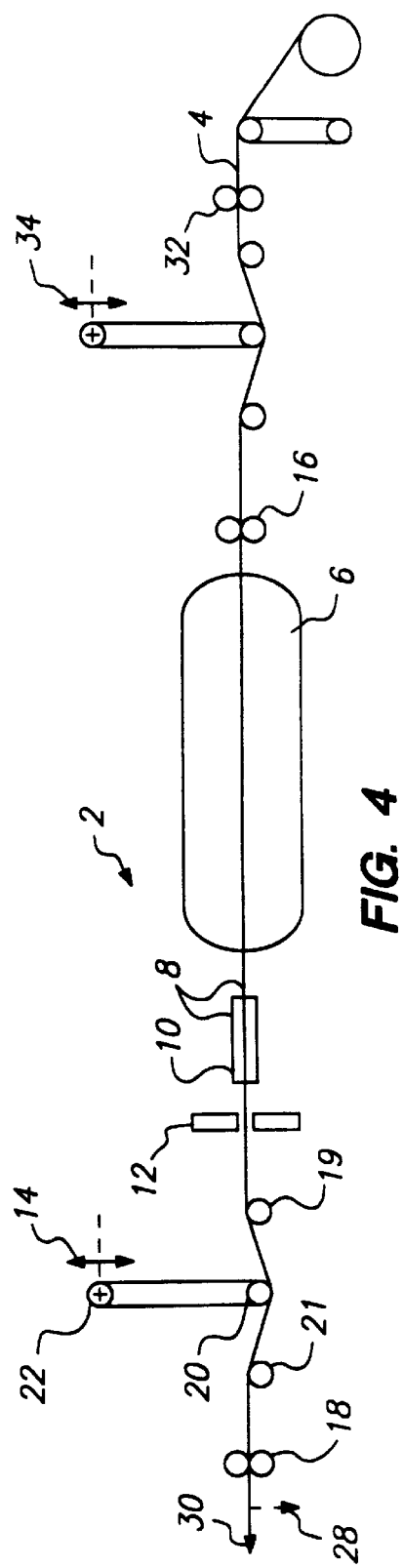
FIG. 4 is a schematic view of an alternative embodiment of the present invention.

FIG. 4 illustrates an alternative embodiment in which the bubble of trapped gas can be augmented in-line and without stopping the production run by employing a third set of nip rolls 32 and a second accumulator 34. The third set of nip rolls and second accumulator is positioned upstream of the bubble of trapped gas.

In use, a production run is begun in a manner similar to the Cook et al and Wray arrangements. Referring to the drawings for illustration purposes, the cross-linked tubing 4 is first threaded through apparatus 2 and connected to a gas supply line 28. Tubing 4 is thus fed continuously through the apparatus 2: between the first set of nip rolls 16, the heating zone 6, expansion zone 8, cooling chamber 10, sensor 12, accumulator 14 and second set of nip rolls 18. The sinuous path is initially adjusted to its minimum length so that the relative position of the upper and lower pulley wheels are closest together. Heating zone 6 is heated to the desired temperature and the gas pressure is introduced through the supply line 28. When the outer diameter of the expanded tubing reaches the desired value according to sensor 12, the length of the sinuous path is adjusted to approximately its maximum. Both sets of nip rolls 16, 18 are closed, trapping a bubble of gas between the first and second sets of nip rolls. The downstream end of the tubing is severed from gas supply line 28 and directed to finishing equipment 30. The tubing exits the pressurized heating zone 6 into the ambient or sub-ambient pressure area of expansion zone 8. (These arrangements are sometimes referred to as "pressure expansion" and "vacuum expansion," respectively.) The tubing begins to expand in this "expansion zone" by creating a pressure differential such that the pressure inside the tubing is greater than the pressure outside the tubing, thereby causing the tubing to expand. As the tubing moves through the cooling chamber, it continues to expand until the temperature falls below its crystalline melting point. The tubing is cooled in the cooling chamber to thereby fix the tubing in an expanded configuration.

As the tubing emerges from cooling chamber 10, changes in the outer diameter are sensed. So long as the outer diameter of the tubing falls within an acceptable range, no adjustments are necessary to the pulley wheels of accumulator 14. However, if the outer diameter of the expanded tubing is smaller than desired, the relative position of the upper and lower pulley wheels is adjusted, moving the upper and lower pulley wheels closer together, so that the length between the first and second sets of nip rolls is decreased, thereby increasing the pressure of the bubble of gas and increasing the outer diameter to the desired outer diameter. Similarly, if the outer diameter of the expanded tubing is larger than desired, the accumulator is adjusted so that the length between the first and second sets of nip rolls is increased, moving the upper and lower pulley wheels farther apart, so that the length between the first and second sets of nip rolls is increased, thereby decreasing the pressure of the bubble of gas and decreasing the tubing outer diameter to the desired outer diameter. The adjustments to compensate for changes in the sensed size of the outer diameter of the tubing may be performed manually, or may be made by providing a feedback mechanism for automatically adjusting the relative positioning of the lower and upper pulley wheels.

The above process can be used for processing single wall or coextruded tubing, or multiple layer tubular extrusions. In the case of coextruded tubing or multiple layer extrusions, the innermost layer could be either an adhesive layer or a polymeric material.

If the distance between the maximum and minimum lengths of sinuous path would otherwise be exhausted, the second embodiment of the present invention, as shown in FIG. 4, illustrates an apparatus in which the bubble of gas can be augmented in-line and without stopping the production run by employing a third set of nip rolls 32 and a second accumulator 34. This arrangement is useful for particularly long production runs. Additional gas can be added to the trapped bubble of gas as follows, once a production run is already in progress. Third set of nip rolls 32 are opened at the beginning of the expansion process. The length of the sinuous path of second accumulator 34 is initially adjusted to its maximum length so that the relative positions of the upper and lower pulley wheels are furthest apart. Third set of nip rolls 32 is closed, thereby forming a second trapped bubble of gas between the third set of nip rolls and first set of nip rolls 16. The upper pulley wheels are adjusted to shorten the length of the sinuous path and thereby increase pressure between third set of nip rolls 32 and first set of nip rolls 16 to a pressure greater than the pressure in the trapped bubble of gas between first and second nip rolls 16, 18. The first set of nip rolls is opened to provide additional gas to the trapped bubble of gas between the first and second sets of nip rolls. The upper and lower pulley wheels of accumulator 14 are separated, lengthening the original trapped bubble of gas while the upper and lower pulley wheels of second accumulator 34 are moved closer together, decreasing the length of the second bubble of gas. Once the upper and lower pulley wheels of accumulator 34 have reached approximately their closest relative distance when the sinuous path is approximately at its minimum, the first set of nip rolls 16 is closed and third set of nip rolls 32 is opened. Production of expanded tubing can continue without interruption by repeating this cycle as often as is necessary.

Variations and modifications can be made to the present invention without departing from the scope of the present invention, which is limited only by the following claims.

I claim:

1. An apparatus for expanding polymeric tubing comprising:
   a first set of nip rolls through which expandable polymeric tubing can be passed, the polymeric tubing having a wall;
   a second set of nip rolls downstream from the first set of nip rolls through which expanded tubing can be passed;
   a heating zone for heating the expandable polymeric tubing;
   means for creating a pressure differential between the inside and outside of the tubing so that, in use, a bubble of pressurized gas is trapped within the tubing between the first and second sets of nip rolls, and such that the pressure differential across the tubing wall causes the tubing to expand;
   a cooling chamber for cooling the tubing;
   means for sensing changes in the outer diameter of the expanded tubing as it emerges from the cooling chamber;
   an accumulator which is positioned downstream from the first set of nip rolls and which comprises a plurality of lower pulley wheels and a plurality of upper pulley wheels, the lower and upper pulley wheels being such that the expanded tubing follows a sinuous path which passes successively between lower and upper pulley wheels;
   means for adjusting the relative position of the lower and upper pulley wheels based upon the sensing of the outer diameter of the expanded tubing, the length of said sinuous path being adjustable between a minimum length and a maximum length, the difference between the minimum and maximum lengths being at least 25 feet; and
   a feedback mechanism for automatically adjusting the relative positioning of the lower and upper pulley wheels, dependent upon the sensed size of the outer diameter of the tubing.

2. The apparatus as defined in claim 1 wherein the upper pulley wheels are movable together as a set, relative to the lower pulley wheels.

3. The apparatus as defined in claim 1 wherein the means for sensing the outer diameter of tubing is a laser micrometer.

4. The apparatus as defined in claim 1 wherein the accumulator is positioned downstream from the heating zone and the cooling chamber.

5. The apparatus as defined in claim 1 wherein the first set of nip rolls is positioned upstream from the heating zone.

6. The apparatus as defined in claim 5 wherein the heating zone further comprises a pressure chamber for equalizing pressure inside and outside of the expandable polymeric tubing.

7. The apparatus as defined in claim 1 wherein the first set of nip rolls is positioned downstream from the heating zone.

8. The apparatus as defined in claim 1 wherein pressure on the tubing while in the cooling chamber is at ambient.

9. An apparatus for expanding polymeric tubing comprising:
   a first set of nip rolls through which expandable polymeric tubing can be passed, the polymeric tubing having a wall;
   a second set of nip rolls downstream from the first set of nip rolls through which expanded tubing can be passed;
   a heating zone for heating the expandable polymeric tubing;
   means for creating a pressure differential between the inside and outside of the tubing so that, in use, a bubble of pressurized gas is trapped within the tubing between the first and second sets of nip rolls, and such that the pressure differential across the tubing wall causes the tubing to expand;
   a cooling chamber for cooling the tubing wherein the cooling chamber pulls a vacuum on the tubing;
   means for sensing changes in the outer diameter of the expanded tubing as it emerges from the cooling chamber;
   an accumulator which is positioned downstream from the first set of nip rolls and which comprises a plurality of lower pulley wheels and a plurality of upper pulley wheels, the lower and upper pulley wheels being such that the expanded tubing follows a sinuous path which passes successively between lower and upper pulley wheels;
   means for adjusting the relative position of the lower and upper pulley wheels based upon the sensing of the outer diameter of the expanded tubing, the length of said sinuous path being adjustable between a minimum length and a maximum length, the difference between the minimum and maximum lengths being at least 25 feet.

* * * * *